United States Patent
Amagai

(10) Patent No.: US 7,817,852 B2
(45) Date of Patent: Oct. 19, 2010

(54) COLOR NOISE REDUCTION IMAGE PROCESSING APPARATUS

(75) Inventor: Hitoshi Amagai, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 704 days.

(21) Appl. No.: 11/879,837

(22) Filed: Jul. 19, 2007

(65) Prior Publication Data

US 2008/0019601 A1    Jan. 24, 2008

(30) Foreign Application Priority Data

Jul. 20, 2006    (JP)    ............... 2006-198101

(51) Int. Cl.
*G06K 9/00*    (2006.01)
(52) U.S. Cl. .................................. 382/167
(58) Field of Classification Search ......... 382/162–167, 382/103, 260, 100; 358/1.9; 348/725
See application file for complete search history.

(56) References Cited

U.S. PATENT DOCUMENTS

| | | | |
|---|---|---|---|
| 6,404,901 B1 * | 6/2002 | Itokawa | 382/103 |
| 7,599,569 B2 * | 10/2009 | Smirnov et al. | 382/260 |
| 2004/0061883 A1 * | 4/2004 | Kanatsu | 358/1.9 |
| 2004/0081354 A1 * | 4/2004 | Mojsilovic et al. | 382/162 |

FOREIGN PATENT DOCUMENTS

| | | |
|---|---|---|
| JP | 2001-175843 A | 6/2001 |
| JP | 2003-219180 A | 7/2003 |
| JP | 2005-191890 A | 7/2005 |
| JP | 2006-174471 A | 6/2006 |
| WO | WO 2005-013622 A1 | 2/2005 |

OTHER PUBLICATIONS

Japanese Office Action dated Jun. 24, 2008, issued in counterpart Japanese Application No. 2006-198101, and English translation thereof.

* cited by examiner

*Primary Examiner*—Vu Le
*Assistant Examiner*—Claire Wang
(74) *Attorney, Agent, or Firm*—Frishauf, Holtz, Goodman & Chick, P.C.

(57) ABSTRACT

An image processing apparatus obtains image data, and extracts a subject pixel (to be subjected to color noise reduction processing) and nearby pixels which are a predetermined distance away from the subject pixel and which are not adjacent to the subject pixel. The image processing apparatus multiplies values of the extracted pixels with predetermined coefficients, and which averages the values of the extracted pixels that have been multiplied by the predetermined coefficients.

7 Claims, 9 Drawing Sheets

COLOR NOISE REDUCTION IMAGE PROCESSING APPARATUS

CROSS-REFERENCE TO RELATED APPLICATIONS

This application is based on Japanese Patent Application No. 2006-198101 filed on Jul. 20, 2006, the entire contents of which are incorporated herein by reference.

BACKGROUND OF THE INVENTION

1. Field of the Invention

This invention is related to a technique of reducing color noise in an image captured by a digital camera.

2. Description of the Related Art

A Charge Coupled Device (CCD) in a digital camera often generates color noise in an image captured with the CCD under dark conditions because of dark current noise and other inherent noises of the CCD. The color noise appears as a significant change of pixels and reduces the quality of the image.

One method for reducing such color noise is to average the color components of pixels adjacent to a given pixel to be corrected. See, for example, JP 2001-175843. However, color noise often spreads to the adjacent pixels. Thus, according to the conventional technique for correcting color noise disclosed in JP 2001-175843, colors of pixels adjacent to a given pixel, including pixels which are affected by color noise, are averaged. As a result, this conventional method cannot effectively reduce color noise, and rather causes the image to be less sharp.

SUMMARY OF THE INVENTION

An object of this invention is effective reduction of color noise in color image data.

According to one aspect of the invention, an image processing apparatus includes: an image data obtaining section which obtains image data; an extracting section which extracts a subject pixel and nearby pixels which are a predetermined distance away from the subject pixel and which are not adjacent to the subject pixel; an averaging processor which multiplies values of the extracted pixels with predetermined coefficients, and which averages the values of the extracted pixels that have been multiplied by the predetermined coefficients; and an image generator which generates an image based on the averaged values of the pixels of the image data.

DETAILED DESCRIPTION

Embodiments of the present invention will be described below by referring to the accompanying drawings.

An image processor 10 according to the present invention, which is a computer, for example, is capable of reducing color noise from digital color image data. Herein "color noise" is noise which appears as a drastic change of color in an image which is taken in high sensitivity photographing.

Figure 1:
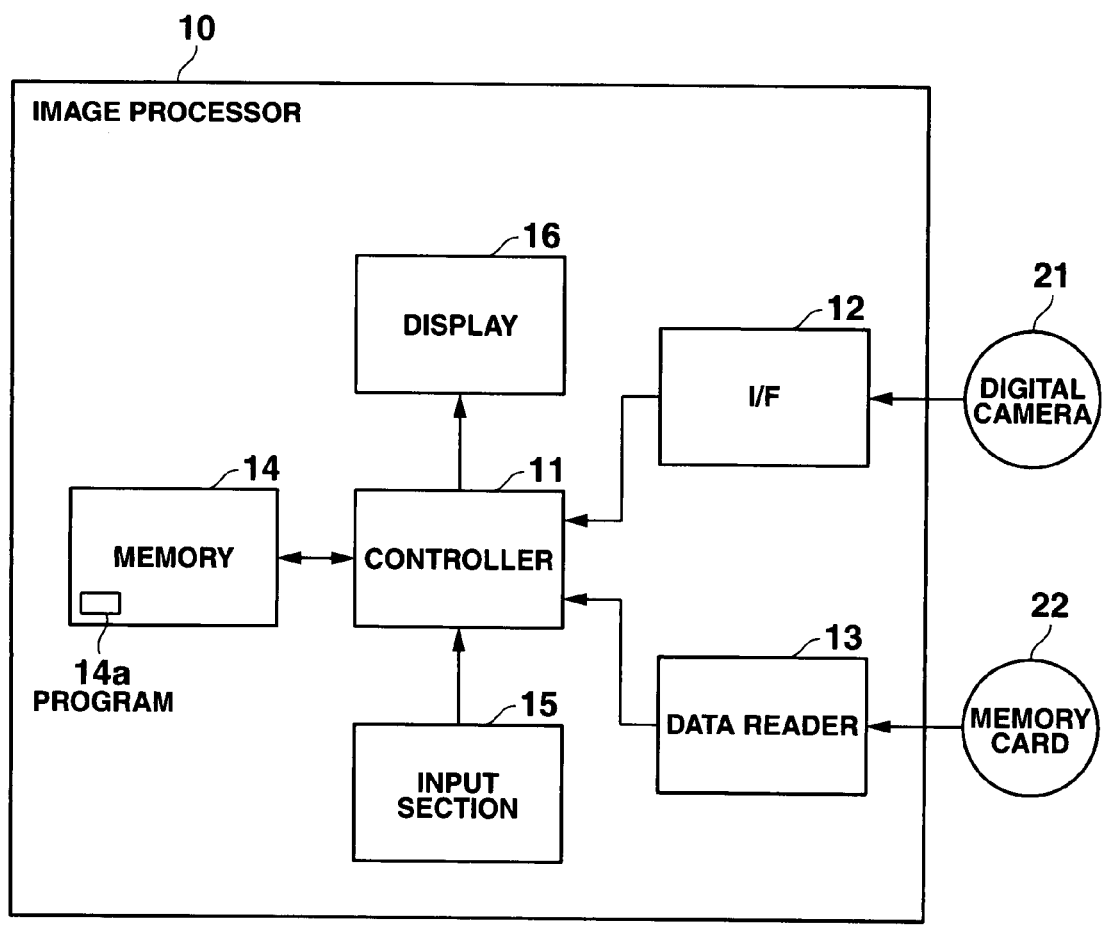
FIG. 1 is a block diagram of an image processing apparatus.

As shown in FIG. 1, the image processor 10 includes a controller 11, an I/F 12, a data reader 13, a memory section 14, an input section 15, and a display 16. The controller 11, which is realized by a computer, controls all of the functions of the image processor 10. The I/F 12, which is a Universal Serial Bus (USB) connector for example, retrieves image data from a digital camera 21 via a USB cable, for example. The data reader 13 (e.g. PC card reader) reads recorded image data from the memory card 22. Memory section 14 includes a Hard Disk (or RAM), and stores image data from digital camera 21 or memory card 22, and other data which used in the controller 11. The memory section 14 also stores a program 14a for noise reduction processing. The controller 11 executes noise reduction processing by reading the program 14a. Input section 15 includes a keyboard and mouse, for example, and accepts various data and commands. Display 16 includes a Liquid Crystal Display (LCD), for example, and displays image data.

Figure 2:
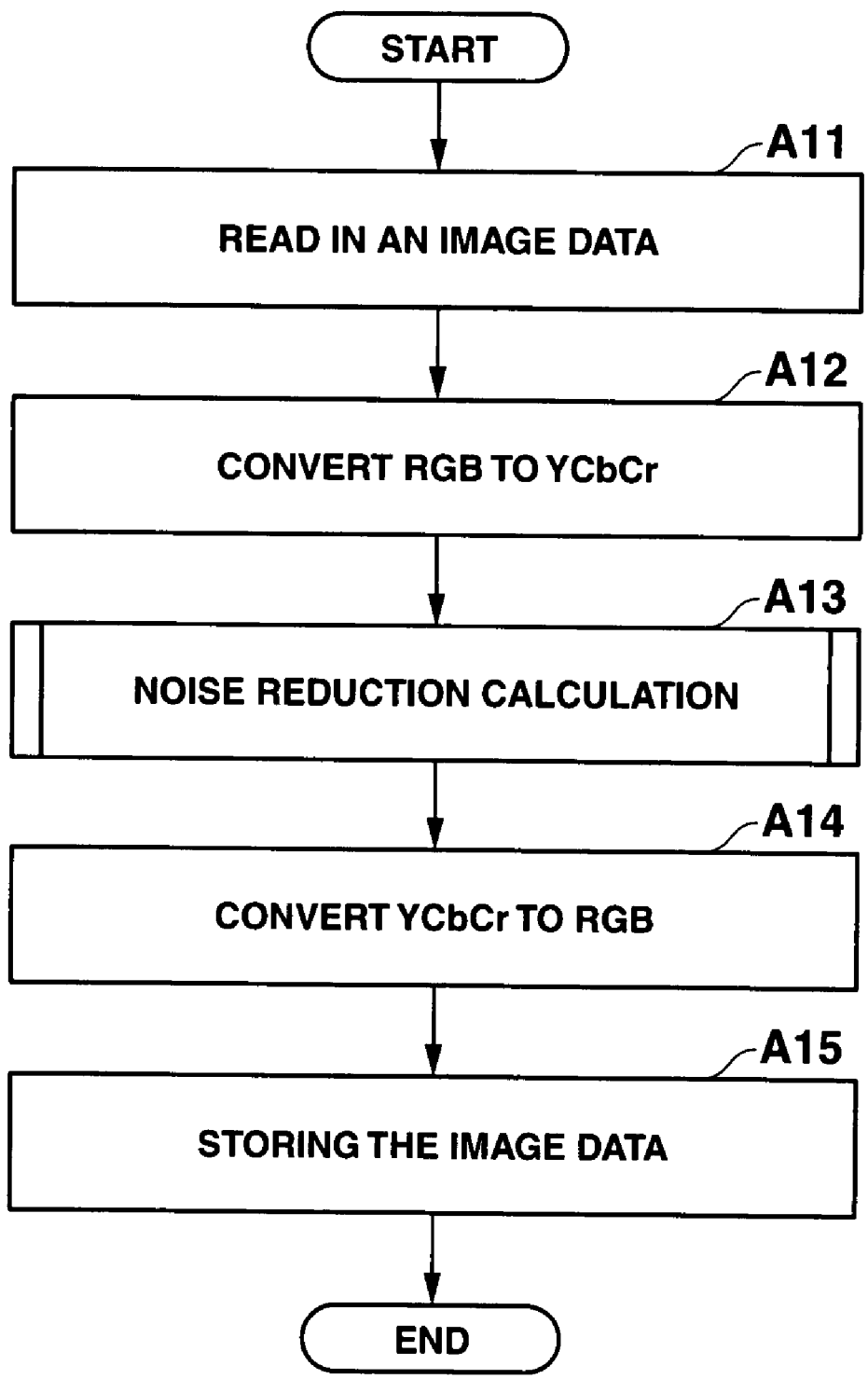
FIG. 2 is a flowchart of a whole process of a noise reduction process in the first embodiment.

FIG. 2 illustrates a flowchart of noise reduction process which is executed by the image processor 10. The processes shown in FIG. 2 and in all other flowcharts hereinafter are executed by the controller 11 by reading program 14a stored in the memory section 14. In the following explanation, it is assumed that the noise reduction executed by the image processing apparatus 10 is performed on image data received from the digital camera 21 or memory card 22.

The controller 11 in the image processor 10 obtains image data which is selected as a subject of noise reduction (step A11). The selected image data is RGB data, and the controller 11 converts the components of the image data from RGB data to YCbCr data according to formula 1 below: (step A12).

$$Y = 0.29900*R + 0.58700*G + 0.11400*B$$

$$Cb = -0.16874*R - 0.33126*G + 0.50000*B$$

$$Cr = 0.50000*R - 0.41869*G - 0.08131*B \quad (1)$$

In formula 1, "*" signifies multiplication, and each of R, G and B indicates the value of the respective R, G or B component. Y indicates luminance, and Cb and Cr indicate the values usually referred to as "color difference" values. To avoid confusion, however, in this application Cb and Cr will be referred to as "color values," because in this application "color difference" is used to refer to the difference between a pixel to be processed and nearby pixels.

Following the conversion of the RGB data to YCbCr data, the controller 11 applies a noise reduction process to each pixel of the image data (step A13), and then the controller 11 converts the resulting YCbCr data that has been subjected to the noise reduction process to RGB data (step A14), and stores the RGB image data in memory section 14 (step A15).

Figure 3:
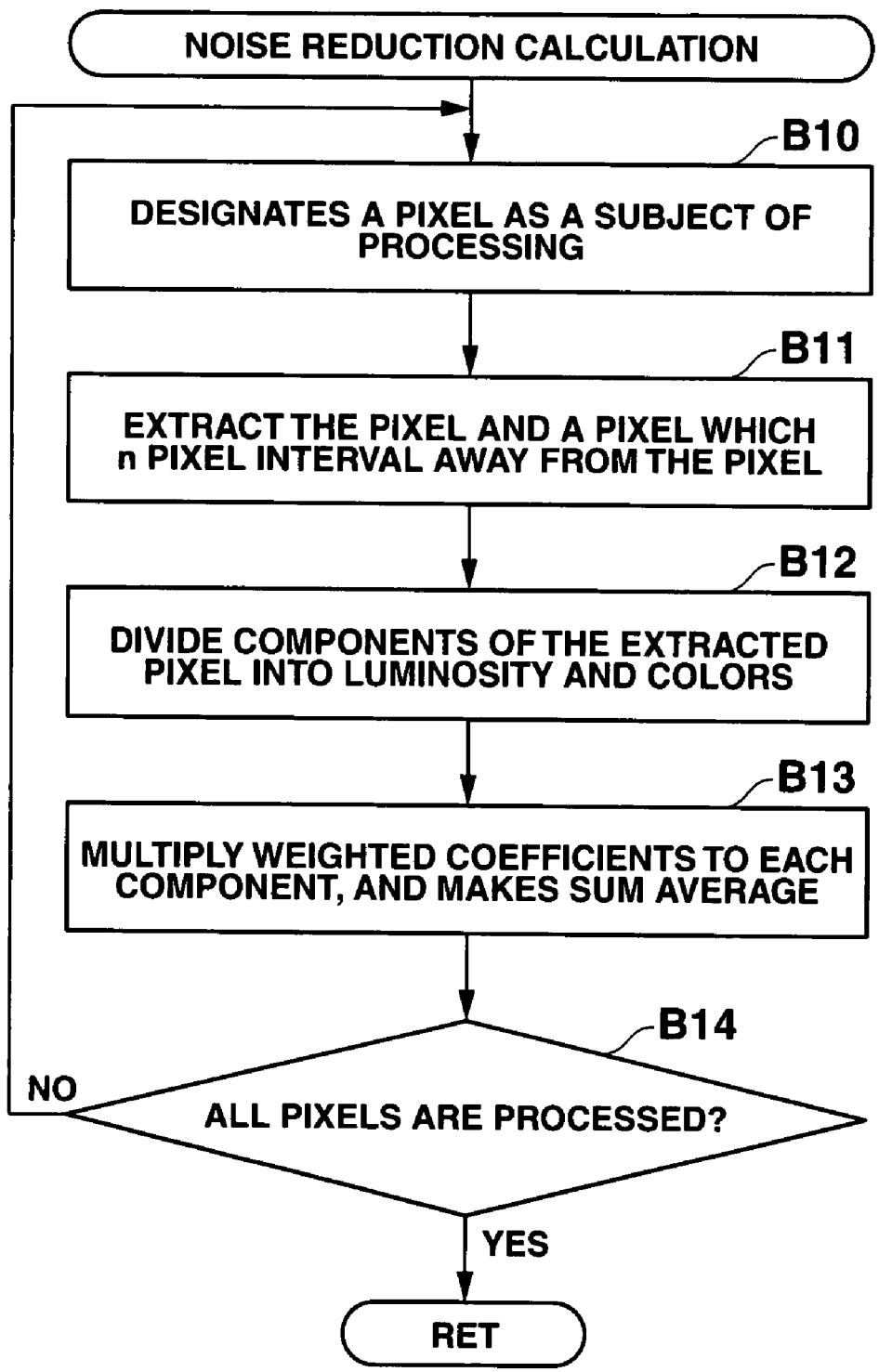
FIG. 3 is a flowchart of a noise reduction calculation process in the first embodiment.
Figure 4:
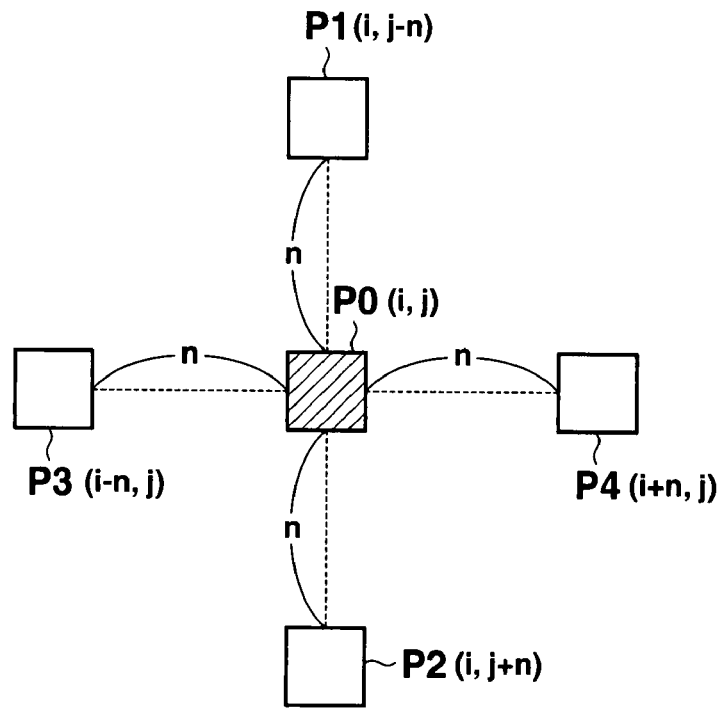
FIG. 4 illustrates placement of a subject pixel and nearby pixels.

FIG. 3 is a flowchart illustrating the noise reduction calculation performed in step A13 of FIG. 2. As shown in FIG. 3, the controller 11 designates a pixel $P_0$ as a subject of processing (step B10). The pixel designated as the subject of processing is referred to herein as a "subject pixel." Then, the controller 11 extracts the subject pixel and nearby pixels which are n pixels away from the subject pixel (step B11). More specifically, as shown in FIG. 4, the subject pixel $P_0$ (shaded in FIG. 4) has coordinates of (i,j) in the image data, where i and j represent the x and y coordinates, respectively, of the subject pixel $P_0$ in the image data. The nearby pixels $P_1$, $P_2$, $P_3$ and $P_4$ (four nearby pixels are extracted in the example shown in FIG. 4) have coordinates in the image data of (i,j−n), (i,j+n), (i−n,j) and (i+n,j), respectively. Thus, each of the nearby pixels $P_1$, $P_2$, $P_3$ and $P_4$ is n pixels away from the subject pixel $P_0$. It is important that the pixels extracted as the nearby pixels are not adjacent to the subject pixel, but rather are n pixels away from the subject pixel. In other words, it is important that n is not equal to 1 in the example shown in FIG. 4. A specific example for the value of n will be explained below.

The controller 11 divides components of the extracted pixels into luminance and color values (step B12). In the following explanation, the luminance Y and color values Cb and Cr of each of the subject pixel $P_0$ and nearby pixels $P_1$, $P_2$, $P_3$ and $P_4$ are referred to as follows:

subject pixel $P_0$: Y(i,j), Cb(i,j), Cr(i,j);
nearby pixel $P_1$: Y(i,j−n), Cb(i,j−n), Cr(i,j−n);
nearby pixel $P_2$: Y(i,j+n), Cb(i,j+n), Cr(i,j+n);
nearby pixel $P_3$: Y(i−n,j), Cb(i−n,j), Cr(i−n,j); and
nearby pixel $P_4$: Y(i+n,j), Cb(i+n,j), Cr(i+n,j).

To obtain a new value for the luminance Y(i,j) of the subject pixel $P_0$, the controller 11 multiples the luminance value of each of the pixels $P_0$, $P_1$, $P_2$, $P_3$ and $P_4$ by a weighting coefficient and calculates a sum average of the weighted luminance values. Similarly, to obtain a new value for the color value Cb(i,j) of the subject pixel $P_0$, the controller 11 multiples the color value Cb of each of the pixels $P_0$, $P_1$, $P_2$, $P_3$ and $P_4$ by a weighting coefficient and calculates a sum average of the weighted color values Cb, and to obtain a new value for the color value Cr(i,j) of the subject pixel $P_0$, the controller 11 multiples the color value Cr of each of the pixels $P_0$, $P_1$, $P_2$, $P_3$ and $P_4$ by a weighting coefficient and calculates a sum average of the weighted color values Cr (step B13). The values of the weighting coefficients for the luminance values are determined based on differences in luminance and color values between the subject pixel $P_0$ and each of the pixels $P_1$, $P_2$, $P_3$ and $P_4$. And the values of the weighting coefficients for the color values are determined based on a luminance ratio of the subject pixel $P_0$ and differences in luminance between the subject pixel $P_0$ and each of the pixels $P_1$, $P_2$, $P_3$ and $P_4$.

In more detail, to calculate the new value of the luminance of the subject pixel $P_0$, a coefficient KY is calculated for each of the nearby pixels. The coefficients for each of the nearby pixels $P_1$, $P_2$, $P_3$ and $P_4$ are $KY_t$, $KY_b$, $KY_l$ and $KY_r$, respectively (t, b, l and r stand for top, bottom, left and right, respectively). Each of the coefficients $KY_t$, $KY_b$, $KY_l$ and $KY_r$ is determined by the following formula (2):

$$dCb<\beta,\ dCr<\beta,\ dY<\alpha : KY = 1-(dY/\alpha)^2$$

$$\text{else: } KY=0 \qquad (2)$$

where: dCb is the color difference between the color value Cb of the subject pixel $P_0$ and the color value Cb of the nearby pixel; dCr is the color difference between the color value Cr of the subject pixel $P_0$ and the color value dCr of the nearby pixel; dY is the difference in luminance between the subject pixel $P_0$ and the nearby pixel; and α and β are thresholds. For example, when determining the coefficient $KY_t$, the differences dY, dCb and dCr are the differences in the luminance and color values of the subject pixel $P_0$ and the nearby pixel $P_1$.

Thus, when calculating each of the coefficients $KY_t$, $KY_b$, $KY_l$ and $KY_r$, the controller 11 sets the coefficient to be $1-(dY/\alpha)^2$ if dCb and dCr are smaller than a threshold β and if dY is smaller than threshold α. If these conditions are not satisfied, the controller 11 sets the coefficient to 0. Using these weighting coefficients, the new value of the luminance of pixel $P_0$, newY(i,j) is calculated by the following formula (3).

$$newY(i,j) = \qquad (3)$$
$$(Y(i,j) + KY_t * Y(i-n,j) + KY_b * Y(i+n,j) + KY_l * Y(i,j-n) +$$
$$KY_r * Y(i,j+n))/(1 + KY_t + KY_b + KY_l + KY_r)$$

In formula (3), the coefficient set for the luminance value Y(i,j) of the subject pixel $P_0$ is 1. (Again, "*" indicates multiplication.)

As described above, coefficients for weighting the luminance values of the nearby pixels in determining the new luminance value for the subject pixel are determined considering both luminance and color values. When the differences in luminance between the subject pixel $P_0$ and the nearby pixels $P_1$ to $P_4$ are lower than a predetermined value (dY<α), a high probability of color noise is expected. Accordingly, the respective luminance values of the nearby pixels $P_1$ to $P_4$ are weighted with a higher coefficient (set to "$1-(dY/\alpha)$") when the difference in color values between the subject pixel and the nearby pixel is lower than a predetermined value (dCb<β, dCr<β). On the other hand, the coefficient of a nearby pixel is set to zero, such that the luminance value of the nearby pixel does not contribute, when differences are larger than the predetermined values (if any one of dY<α, dCb<β, or dCr<β is not satisfied), whereby pixels with a large difference in luminosity and color are omitted. As a result, color noise is effectively reduced without reducing the sharpness of the image.

To calculate the new value of the color value Cb and the new value of the color value Cr of the subject pixel $P_0$, a coefficient KY2 is calculated for each of the nearby pixels. The coefficients for each of the nearby pixels $P_1$, $P_2$, $P_3$ and $P_4$ are $KY2_t$, $KY2_b$, $KY2_l$ and $KY2_r$, respectively (again, t, b, l and r stand for top, bottom, left and right, respectively). Each of the coefficients $KY2_t$, $KY2_b$, $KY2_l$ and $KY2_r$ is determined by the following formula (4):

$$dY<\alpha: KY2=(1-dY/\alpha)$$

$$\text{else: } KY2=0 \qquad (4)$$

Thus, when calculating each of the coefficients $KY2_t$, $KY2_b$, $KY2_l$ and $KY2_r$, the controller 11 sets the coefficient to be $1-(dY/\alpha)$ if dY is smaller than threshold α. If this condition is not satisfied, the controller 11 sets the coefficient to 0. Using these weighting coefficients, the new value of the color value Cb of pixel $P_0$, newCb(i,j), and the new value of the color value Cr of pixel P0, newCr(i,j), are calculated by the following formulas (5) and (6).

$$newCb(i, j) = [rY * Cb(i, j) + \\ (1 - rY) * [KY2_t * Cb(i-n, j) + KY2_b * Cb(i+n, j) + \\ KY2_l * Cb(i, j-n) + KY2_r * Cb(i, j+n)]] / [rY + \\ (1-rY) * (KY_t + KY_b + KY_l + KY_r)]$$ (5)

$$newCr(i, j) = \\ [rY * Cr(i, j) + (1 - rY) * [KY2_t * Cr(i-n, j) + KY2_b * Cr(i+n, j) + \\ KY2_l * Cr(i, j-n) + KY2_r * Cr(i, j+n)]] / [rY + \\ (1-rY) * (KY_t + KY_b + KY_l + KY_r)]$$ (6)

As is apparent from formulas (5) and (6), the color values Cb(i,j) and Cr(i,j) of the subject pixel $P_0$ are weighted by a value rY in formulas (5) and (6), respectively, and the respective color values Cb and Cr of the nearby pixels $P_1$ to $P_4$ are further weighted by a value (1−rY) in formulas (5) and (6). rY designates a ratio of luminance of the subject pixel $P_0$, while (1−rY) designates a ratio of luminance of the nearby pixels $P_1$ to $P_4$. For example, if the resolution is 255, the ratio of luminance rY is Y(i,j)/255. Since the values Cb(i,j) and Cr(i,j) of the subject pixel $P_0$ are weighted multiplied by rY in formulas (5) and (6), respectively, and the respective color values Cb and Cr of the nearby pixels $P_1$ to $P_4$ are further multiplied by (1−rY) in formulas (5) and (6), the values newCb(i,j) and newCr(i,j) are affected more strongly by the values of Cb and Cr of the nearby pixels, when the luminosity Y(i,j) of the subject pixel $P_0$ is lower. Thus, the values newCb(i,j) and newCr(i,j) of the subject pixel $P_0$ are determined based on the property of color noise that the color noise is noticeable (or more noticeable) when the luminance is low and less noticeable (or unnoticeable) when the luminance is high.

Moreover, in accordance with formula (4), in formulas (5) and (6) the respective weights of the nearby pixels $P_1$ to $P_4$ are set to $(1-dY/\alpha)*(1-rY)$, when the respective differences in luminance between the nearby pixels $P_1$-$P_4$ and the subject pixel $P_0$ are lower than a predetermined value ($dY<\alpha$). $(1-dY/\alpha)$ gets larger when the difference in luminance dY between the subject pixel and the nearby pixel gets smaller, and $(1-dY/\alpha)$ gets smaller when the difference in luminance dY between the subject pixel and the nearby pixel gets larger. The coefficients $KY2_t$, $KY2_b$, $KY2_l$ and $KY2_r$ thus correspond to the characteristic that a difference in color between the subject pixel and the nearby pixels is expected to be small when the difference in luminance is small, since luminance varies drastically when color varies drastically. And since (1−rY) gets smaller when the luminance of $P_0$ gets larger, the multiplication of the coefficients $KY2_t$, $KY2_b$, $KY2_l$ and $KY2_r$ by (1−rY) in formulas (5) and (6) provides that an area which has low luminance should be averaged strongly (placing greater weight on nearby pixels), since such an area of low luminance is expected to have more color noise.

Only luminance is considered when determining the values of the coefficients for calculating the new color values for the subject pixel $P_0$, because it is difficult to decide coefficients based on the color values Cb and Cr, which are distorted by color noise in a dark area.

Figure 5:
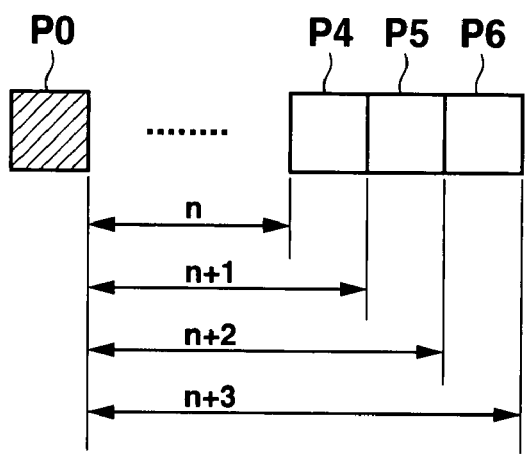
FIG. 5 illustrates placement of nearby pixels which are farther than n pixels from the subject pixel.

After determining the new luminance and color values for the subject pixel $P_0$ in the manner described above in step B13, in step B14, the controller 11 determines whether all of the pixels of the image data have been processed. If all of the pixels have not been processed, the process returns to step B10, and the controller 11 designates a next pixel to be the subject pixel $P_0$, and steps B11-B13 are performed for the newly designated (i.e., next) subject pixel $P_0$. After processing all pixels (yes in step B14), the controller terminates this loop. As shown in FIG. 4, it is assumed in the foregoing description that the noise reduction is performed using four nearby pixels ($P_1$-$P_4$), which are n pixels from the subject pixel $P_0$. More distant pixels are also available for noise reduction. If additional, more distant, pixels are used, such pixels are weighted according to their distance from the subject pixel $P_0$ in formulas (3), (5) and (6). For example, as shown in FIG. 5, the coefficients of more distant pixels are weighted in the manner $P_4<P_5<P_6$, corresponding nearby pixels $P_4$ to $P_6$ which are n or more pixels away from the subject pixel $P_0$. By averaging nearby pixels which are n or more pixels away from the subject pixel and whose coefficients are weighted corresponding their distances from the subject pixel, the accuracy of the noise reduction is improved.

More concretely, the present invention may be used in connection with JPEG image compression. The noise reduction in the embodiment described above is executed in luminance and color components. This corresponds to the YCbCr components which are used in the JPEG format. RGB data is converted to YCbCr data in JPEG. Moreover, calculation in luminance and color components, with adaptation of respective coefficients, enables effective noise reduction which is fit for human visual characteristics.

Human visibility is very sensitive to luminosity, and not so sensitive to color. Thus, the luminance component of the data is not decimated (downsampled) in JPEG, while the color components of the data are decimated (downsampled) by a factor of 2. The formulas (3), (5) and (6) described above are able to cope with this decimation (downsampling).

An averaging calculation in a convention noise reduction process is performed on the subject pixel and pixels adjacent to the subject pixels. However, the color of the adjacent pixels is often altered. Thus, performing noise reduction by averaging the adjacent pixels is ineffective, and rather spoils the sharpness of the image. An edge enhance filter is often applied to an image to recover the sharpness of the image, but it possibly changes the feel of the image. To solve these problems, the noise reduction process in the embodiment described above uses nearby (but not adjacent) pixels which are n pixels away from the subject pixel $P_0$, as explained above and shown in FIG. 4.

Figure 6:
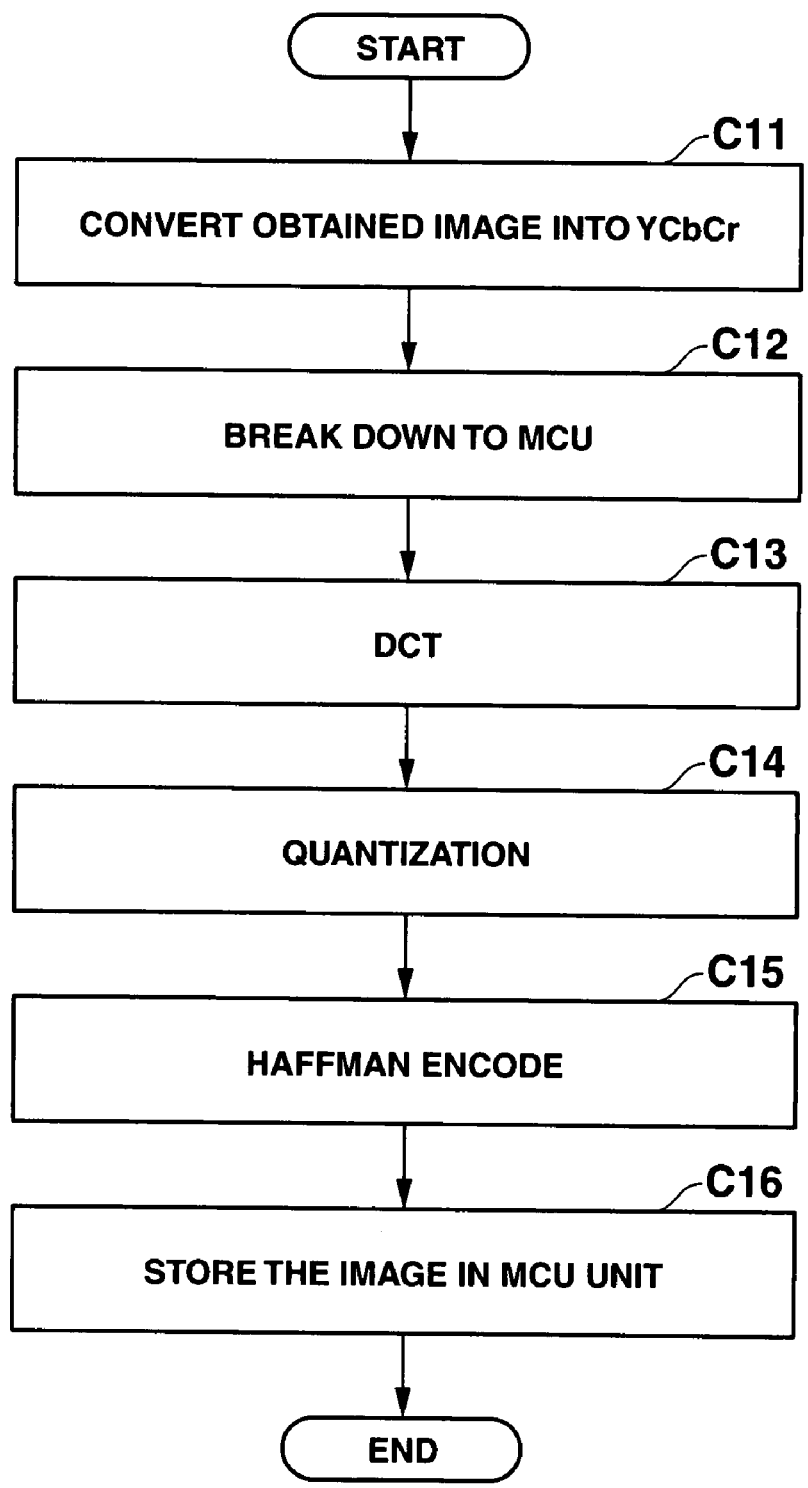
FIG. 6 is a flowchart of an image data storing process in JPEG format.

A digital camera 21 stores image data which is obtained by a CCD of the digital camera. Usually the JPEG format is chosen as the format for storing the image data, since the JPEG format has good compression ratio. FIG. 6 is a flowchart of image data storing processing in JPEG format. Obtained image data is converted to YCbCr data, which is suitable for JPEG compression (step C11). Then the image data is broken down into Minimum Code Units (MCUs) (step C12). This break down process is performed to reduce processing time, since the whole image data is too large for image data processing such as Discrete Cosine Transformation (DCT), quantization and Huffman coding. A unit size in this embodiment is 16*16 pixels. Usually a unit size depends on sampling factor. Each MCU is processed by discrete cosine transform (DCT), quantization and Huffman coding (step C13-C15), and is stored in the MCU unit (step C16).

Figure 7:
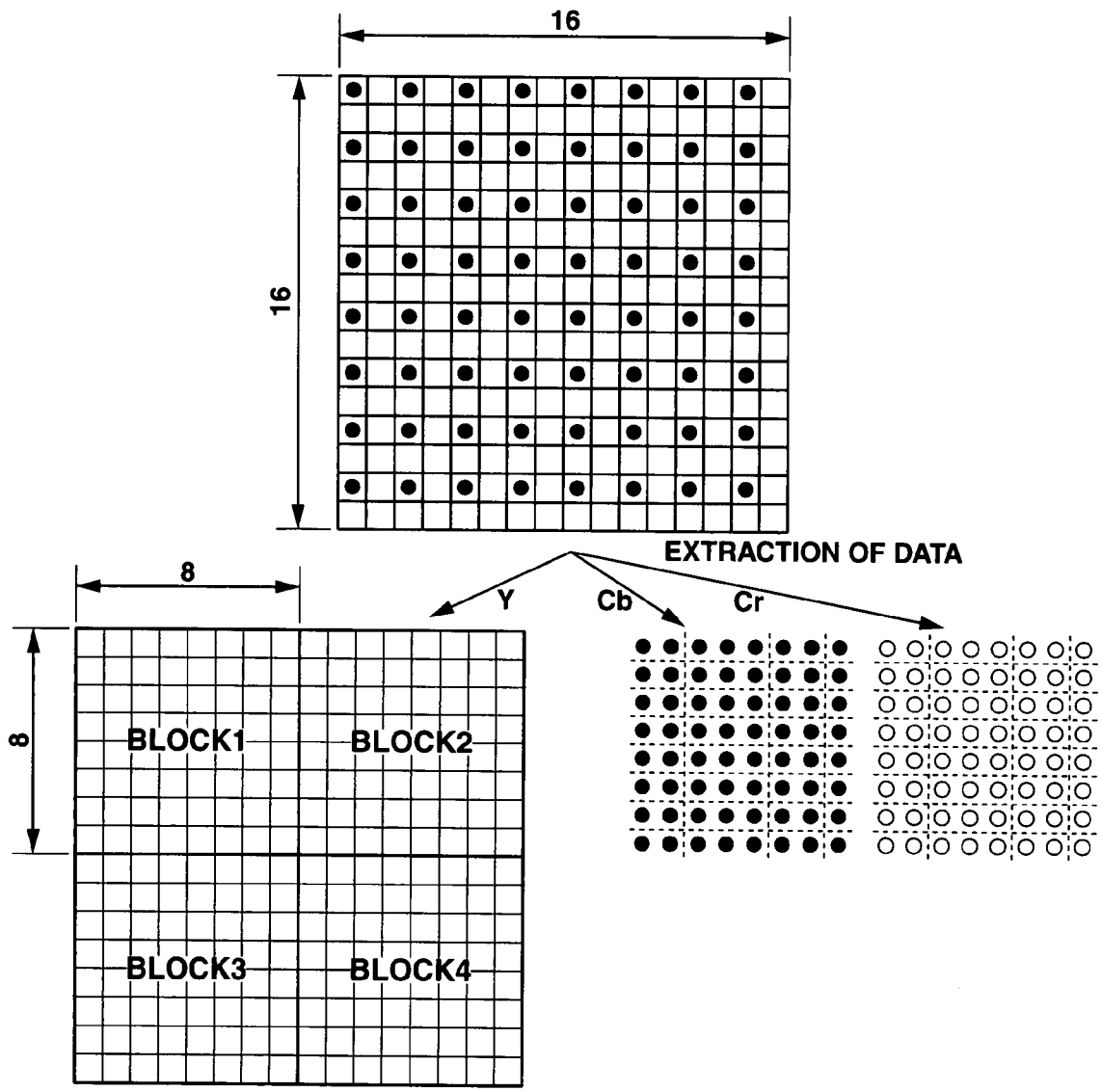
FIG. 7 illustrates a MCU used for the image data storing process in JPEG format.

More specifically, as shown in FIG. 7, the MCU has 16*16 pixels. Components in the unit are divided to 8*8 pixels. That is, as shown in FIG. 7, a 16*16 block of luminance data is divided into four 8*8 blocks, and the color component data is decimated (downsampled) to an 8*8 Cb block and an 8*8 Cr block. These components are converted to frequency domain by DCT. The frequency components are quantized to reduce data size, then, are encoded in Huffman code for more reduction.

However, the processing often causes a bias in each 8*8 pixels block. Boundary lines are able to recognized when zooming in JPEG image. In a zoomed-in image it is often seen that a block is tinged with yellow, a next block is tinged with red, etc. Therefore, the conventional noise reduction, which is performed by averaging adjacent pixels, keeps the color bias in each block, consequently is not able to clean up color noise.

Figure 8:
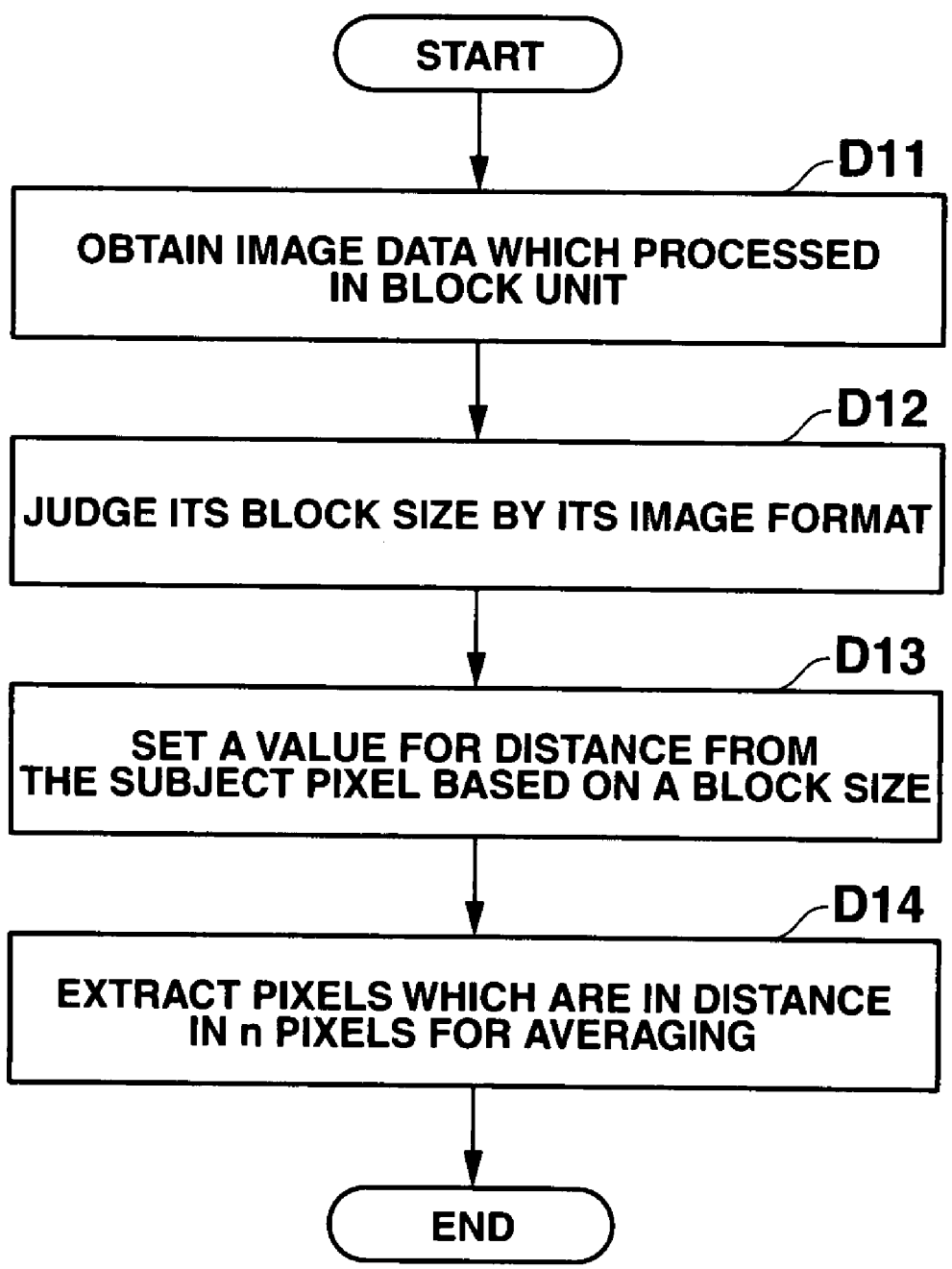
FIG. 8 is a flowchart of an extraction process of nearby pixels from an image which has a block structure.

Pixels in a next block, not the pixels next to a subject pixel, are suitable for averaging in color noise reduction. Extraction of nearby pixels is performed in process shown in FIG. 8, which is a flowchart illustrating a process of extracting nearby pixels from image data that is in block units by the image processing apparatus 10, and which is performed in place of step B11 in FIG. 3. As shown in FIG. 8, the controller 11 obtains image data which is processed in block units (step D11), and judges the block size based on the image format (step D12). For example, a block size of the JPEG format is 8*8 pixels. A block size of the MPEG format is 16*16 pixels. In the H.264 standard, block sizes are available in four modes which are 16*16, 16*8, 8*16 and 8*8. A suitable block size will be selected if a still image is made from the movie data.

Based on the block size judged in step D12, the controller 11 sets a value for the distance n from the subject pixel (step D13). For example, "n" is set to eight pixels (n=8) when the block size is 8*8 pixels. The controller 11 extracts pixels which are n pixels away from the subject pixel for averaging (step D14). After step D14, steps B12 onward in FIG. 3 are performed.

Thus, as described above, when image data has a block structure, an averaging process using pixels that are not in the same block as the subject pixel enables pixels affected by color noise to be omitted, and achieves effective color noise reduction.

Variation of the First Embodiment

A certain image has recognizable block noise. In this case, it is more effective to use pixels farther (several pixels away) away from the subject pixel than described above for averaging. For example, the most appropriate value for a JPEG image is 10=8 (block size)+2.

Figure 9:
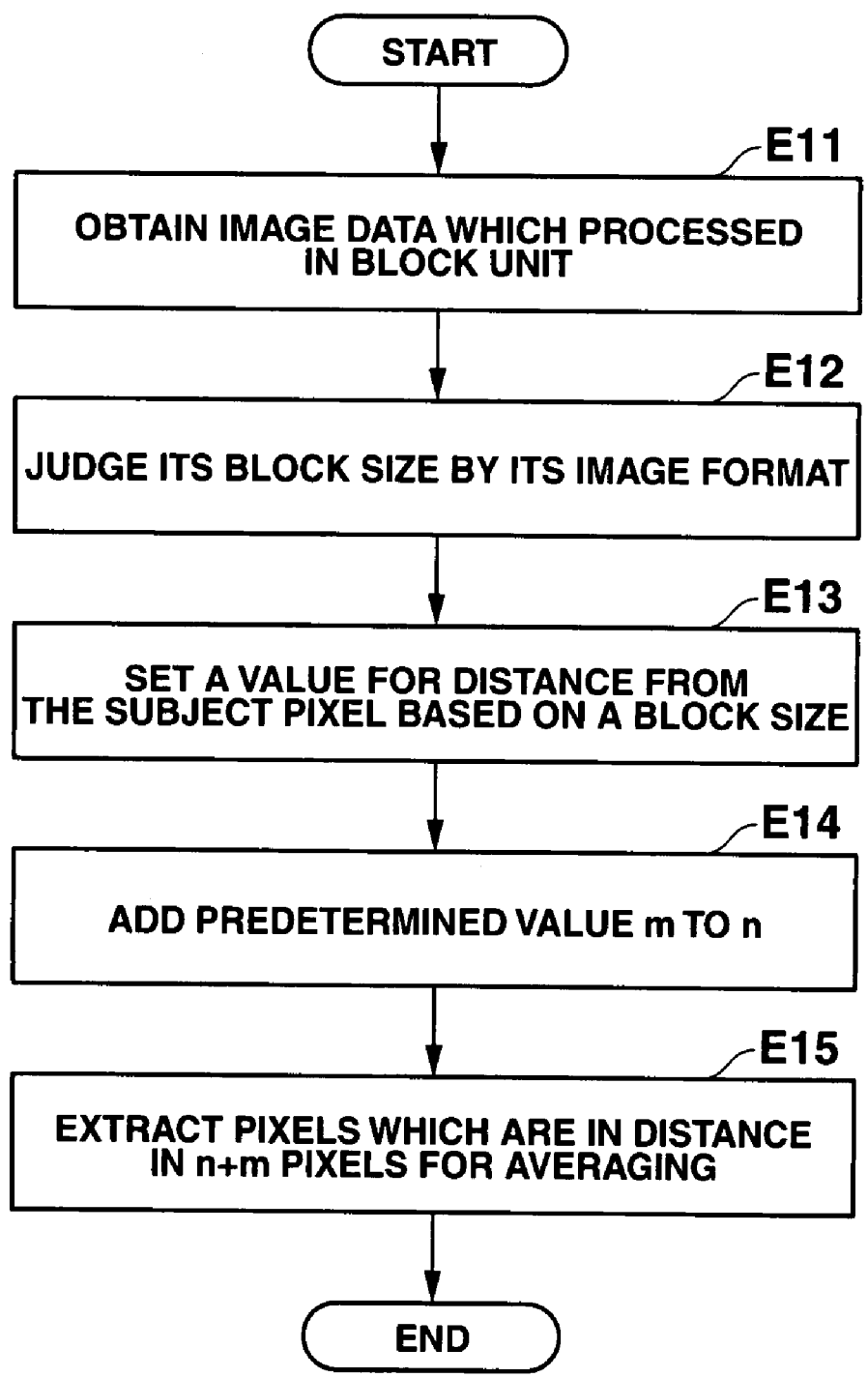
FIG. 9 is another flowchart of an extraction process of nearby pixels from an image which has a block structure.

FIG. 9 is a flowchart of another process of extracting nearby pixels from image data that is in block units by the image processing apparatus 10. Processes in steps E11 to E13 are same as steps D11 to D13 in FIG. 8. That is, the controller 11 obtains image data which is processed in block units (step E11), judges the block size based on the image format (step E12), and sets a value for the distance n from the subject pixel based on the block size (step E13).

Then, a predetermined value m (pixels) is added to the value n set in step E13, where "m" is set to the most proper value for smoothing block noise. For example, m is two for a JPEG image. The controller 11 extracts pixels which are n+m pixels away from the subject pixel for averaging (step E15). After step E15, steps B12 onward in FIG. 3 are performed.

A timing at which the subject pixel crosses a block border and a timing at which a nearby pixel(s) used for averaging crosses a block border(s) are different in the extraction process. That is, the value m is added to the value n so that the subject pixel does not cross a border between blocks at the same time as a nearby pixel(s) also crosses a border between blocks as the various pixels of the image data are selected to be the subject pixel.

According to this modification of the first embodiment, nearby pixels used for averaging are extracted from a second block which is adjacent to a first block that includes the subject pixel or are extracted from a third block which is next to the second block. Thus differences of image tone in each block are averaged in the process. As a result, a smoothing effect for block noise is achieved.

As described above, using of pixels farther away (by a predetermined number of pixels) from the subject pixel than the block size, enables effective noise reduction with smoothing for block noise.

As shown in FIG. 5, moreover, pixels that are farther than n+m pixels from the subject pixel are also available for the noise reduction. Additional pixels are weighted according to their distances from the subject pixel.

A Second Embodiment

Figure 10:
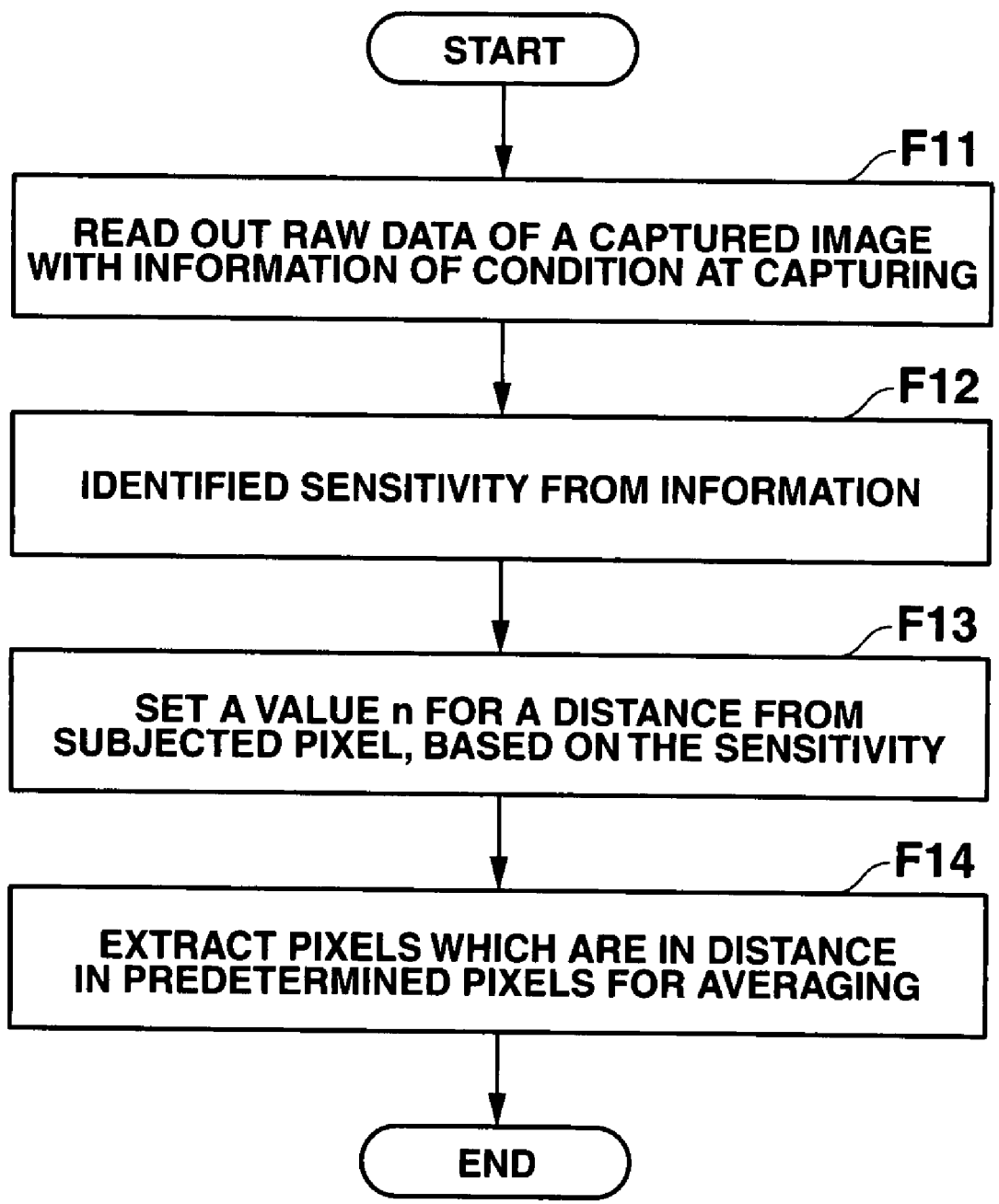
FIG. 10 is a flowchart of an extraction process of nearby pixels from an image in the second embodiment.

According to a second embodiment, the data that is the subject of noise reduction processing is image data which does not have block structure, that is, RAW data. RAW data is data outputted from the digital camera 21 without any image processing. An explanation of processing performed when image data is RAW data will be described hereinafter with respect to FIG. 10, which is a flowchart of an extraction process for nearby pixels in the second embodiment.

The controller 11 reads out RAW data of a captured image with information of a condition at a time of capturing the image (step F11). This information includes sensitivity information, for example ISO speed. The controller 11 identifies the sensitivity from the information (step F12), and sets a value for n, based on the sensitivity (step F13). The value n increases according to increases in the sensitivity, since an image captured with a high sensitivity condition has a larger spread of color noise. The controller 11 extracts pixels which n pixels from the subject pixel (where n is based on the sensitivity information), for averaging (step F14). After step F14, step B12 and the subsequent steps in FIG. 3 are performed.

As described above, pixels which are not so much affected by color are selected, as well as according to the first embodiment, by setting the value of n based on the sensitivity information, even though the image doesn't have a block structure. An effective noise reduction is achieved by the selection of the value of n based on the imaging sensitivity.

The image processing apparatus 10 is described as a separate apparatus from digital camera 21 in the above embodiments. It is possible to build a noise reduction processing function which is achieved by the image processing apparatus described above into the digital camera 21. The digital camera 21 can perform the noise reduction on a captured image and store the image in its closed system. This configuration will free users from potentially annoying work to be performed after capturing an image.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention The present invention can be implemented using hardware, software, or a combination of both hardware and software. The software used for the present invention can be stored on one or more processor readable storage devices including hard disk drives, CD-ROMs, optical disks, floppy disks, tape drives, RAM, ROM, or other suitable storage devices. In alternative embodiments, some or all of the software can be replaced by dedicated hardware including custom integrated circuits, gate arrays, FPGAs, PLDs, and special purpose computers. Hardware that can be used for the present invention includes computers, handheld devices, telephones (e.g. cellular, Internet enabled, digital, analog, hybrids, and others), and other hardware known in the art. Some of these devices include processors, memory, nonvolatile storage, input devices, and output devices.

What is claimed is:

1. An image processing apparatus comprising: an image data obtaining section which obtains image data; a pixel extracting section which extracts, from the obtained image data, a subject pixel and surrounding pixels which are a distance away from the subject pixel as processing targets, wherein the distance is determined based on a block size which depends on a saving format of the image data; an averaging processing section which multiplies values of the extracted pixels with predetermined weighting coefficients, and performs averaging processing; and an image generating section which generates noise-removed image data based on pixel values obtained by the averaging processing section.

2. An image processing apparatus comprising:
   an image data obtaining section which obtains image data which has a block structure;
   a size judging section which judges a block size of the image data obtained by the image data obtaining section;
   a distance setting section which sets a distance from a subject pixel based on the block size judged by the size judging section;
   a pixel extracting section which extracts the subject pixel and pixels which are a given distance away from the subject pixel based on the distance set by the distance setting section, from the image data as processing targets;
   an averaging processing section which multiplies values of the extracted pixels with predetermined weighting coefficients, and performs averaging processing; and
   an image generating section which generates noise-removed image data based on pixel values obtained by the averaging processing section.

3. The image processing apparatus according to claim 2, wherein the pixel extracting section obtains the given distance by adding a number of pixels based on a smoothing of a block noise to the distance set by the distance setting section.

4. A method for image processing comprising: obtaining image data; extracting, from the obtained image data, a subject pixel and surrounding pixels which are a distance away from the subject pixel as processing targets, wherein the distance is determined based on a block size which depends on a saving format of the image data; multiplying values of the extracted pixels with predetermined weighting coefficients, and performing averaging processing; and generating noise-removed image data based on pixel values obtained by the averaging processing, wherein the method for image processing is performed by a computer of an image processing apparatus.

5. A method for image processing comprising: obtaining image data which has a block structure; judging a block size of the obtained image data; setting a distance from a subject pixel based on the block size; extracting the subject pixel and pixels which are a given distance away from the subject pixel based on the set distance, from the image data; multiplying values of the extracted pixels with predetermined weighting coefficients, and performing averaging processing; and generating noise-removed image data based on pixel values obtained by the averaging processing, wherein the method for image processing is performed by a computer of an image processing apparatus.

6. A non-transitory computer-readable storage medium having a computer-readable program stored thereon that is executable by a computer to cause the computer to perform functions comprising: obtaining image data; extracting, from the obtained image data, a subject pixel and surrounding pixels which are a distance away from the subject pixel as processing targets, wherein the distance is determined based on a block size which depends on a saving format of the image data; multiplying values of the extracted pixels with predetermined weighting coefficients, and performing averaging processing; and generating noise-removed image data based on pixel values obtained by the averaging processing.

7. A non-transitory computer-readable storage medium having a computer-readable program stored thereon that is executable by a computer to cause the computer to perform functions comprising: obtaining image data which has a block structure; judging a block size of the obtained image data; setting a distance from a subject pixel based on the block size; extracting the subject pixel and pixels which are a given distance away from the subject pixel based on the set distance, from the image data; multiplying values of the extracted pixels with predetermined weighting coefficients, and performing averaging processing; and generating noise-removed image data based on pixel values obtained by the averaging processing.

* * * * *